United States Patent
Matsui et al.

[11] Patent Number: 5,951,173
[45] Date of Patent: Sep. 14, 1999

[54] ANGULAR CONTACT BALL BEARING

[75] Inventors: Masahito Matsui; Hirotoshi Aramaki; Hiroya Miyazaki, all of Kanagawa, Japan

[73] Assignee: NSK Ltd., Tokyo, Japan

[21] Appl. No.: 09/146,355

[22] Filed: Sep. 3, 1998

[30] Foreign Application Priority Data

Sep. 3, 1997 [JP] Japan .................................. 9-238268

[51] Int. Cl.$^6$ .................................................. F16C 33/58
[52] U.S. Cl. .......................... 384/513; 384/450; 384/544
[58] Field of Search ................................. 384/450, 513, 384/515, 516, 537, 544

[56] References Cited

U.S. PATENT DOCUMENTS

| 4,623,268 | 11/1986 | Pollastro | 384/515 X |
| 4,699,527 | 10/1987 | Hutzel | 384/513 X |
| 5,176,456 | 1/1993 | Takebayashi et al. | 384/493 |
| 5,501,530 | 3/1996 | Nagai et al. | 384/516 |
| 5,522,667 | 6/1996 | Miyake | 384/513 X |

FOREIGN PATENT DOCUMENTS 0 158 206  10/1985  European Pat. Off. .

*Primary Examiner*—Thomas R. Hannon
*Attorney, Agent, or Firm*—Sughrue, Mion, Zinn, Macpeak & Seas, PLLC

[57]     ABSTRACT

In the angular contact ball bearing, the respective conditions of the inner race dimensions are designed most suitably to prevent the shoulder portion of the inner race from being opened outwardly, thereby being able to prevent a slipping phenomenon from occurring between the inner race and shaft.

8 Claims, 11 Drawing Sheets

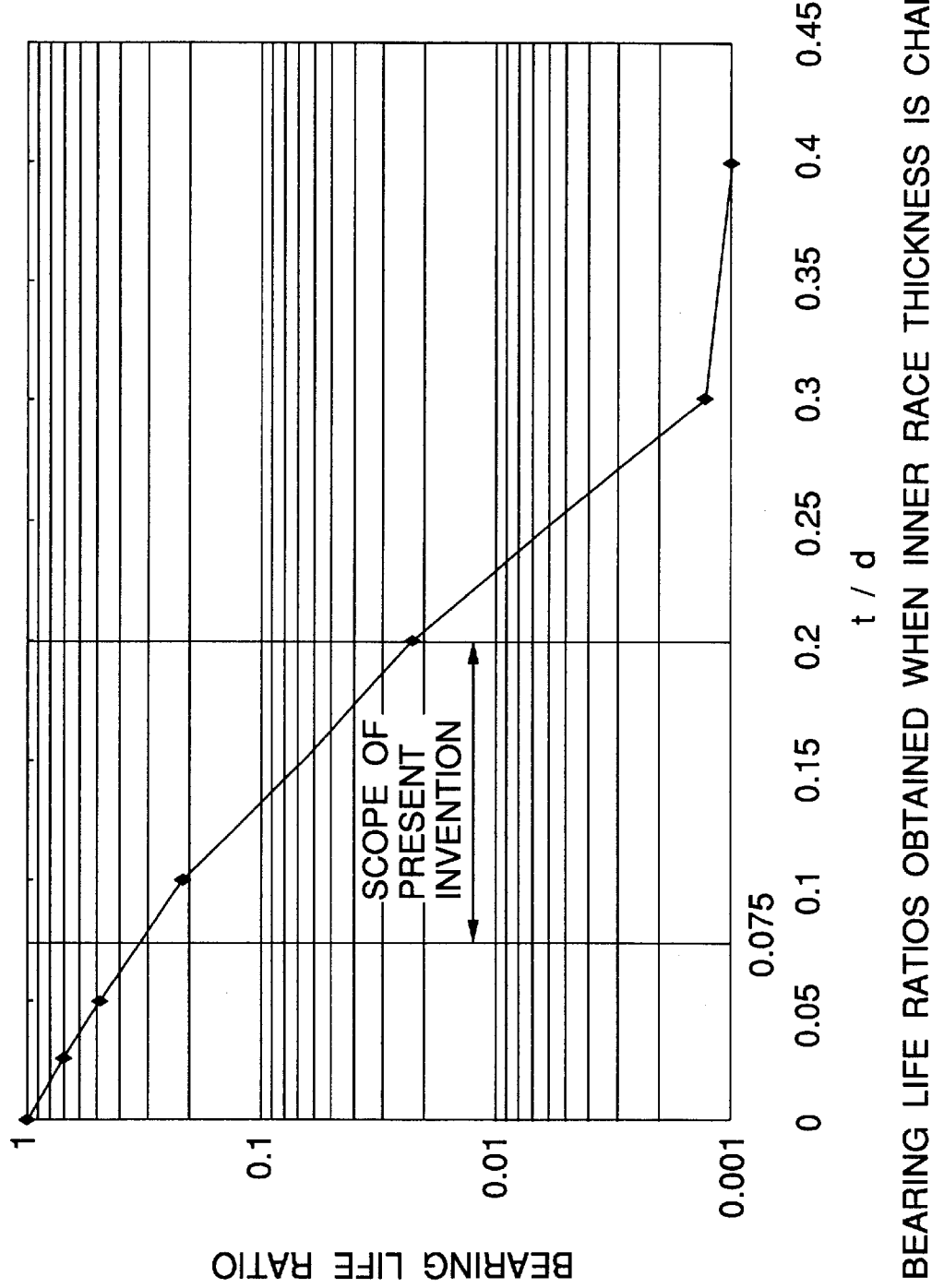

F — FLOATED AREA  
P, 3C

CONTACT SURFACE PRESSURE

EASY-TO-SLIP AREA

AXIAL DISTANCE

ANGULAR CONTACT BALL BEARING

BACKGROUND OF THE INVENTION

1. Field of the Invention

The present invention relates to an improved angular contact ball bearing for use in a vehicle wheel.

2. Description of the Prior Art

Conventionally, for a vehicle wheel, especially, for a car wheel, there is often used a double row ball bearing. For example, in the case of such a bearing for a car wheel as shown in FIG. 1, although the rotation speed is relatively low, the weight of the car is applied directly to the bearing, so that the bearing receives a large radial load. Also, when a car takes a sudden turn, depending on an acceleration applied onto the car, further larger radial, axial and moment loads are applied to the bearing. Therefore, there has been employed a bearing which is as compact as possible in size but is as large as possible in the load capacity.

In order to reduce the bearing load of a bearing for a car wheel and thereby enhance the durability thereof, there has been employed a design in which a ball-to-ball distance (bearing-to-bearing distance) is set as long as possible to thereby make longer a distance between operation points. Therefore, the length L of the shoulder portion 3a of an inner race 3 shown in FIG. 2 is shortened. This tendency is outstanding especially in a bearing of a type that no seal is attached to the shoulder portion 3a.

In the bearing for a car wheel, in order to prevent the bearing from interfering a corner portion provided in the root of the shoulder portion of the inner race with a shaft which is supported by the bearing, there is formed a relatively large escape portion 3c.

Referring to a roller bearing, if it is mounted on a shaft with a small interference and is rotated with a load applied to the inner race thereof, there is a possibility that there can occur a harmful slippage in the circumferential direction thereof between the inner race and shaft. This slipping phenomenon of the inner race is generally referred to as a creep. In particular, when the fitting surface of the inner race has a short interference, the point of loading is moved in the circumferential direction to thereby shift the position of the inner race in the circumferential direction with respect to the shaft or housing.

In a bearing for a car wheel of a type that an inner race thereof can be rotated, there can be produced a creep phenomenon that the inner race and shaft are shifted in position in the rotation direction. When such creep phenomenon occurs, then the fitting surfaces of the inner race and shaft slip with respect to each other so that the fitting surfaces thereof are worn and damaged. As a result of this, the fitting engagement between the inner race and the shaft is loosened to thereby produce a strange sound. And, if the inner race is damaged heavily, then a service life of the bearing itself is possibly shortened, the inner race is possibly broken, and the inner race and the shaft may score each other.

As a countermeasure against the creep phenomenon, it is expected that a large interference is set between the inner race and the shaft and a axial tension for holding the inner race in the axial direction is increased. On the other hand, there is a limit to increase such interference, because a tensile stress acting in the circumferential direction is applied to the inner race of the bearing. In addition, if the interference is increased, then it becomes more difficult to mount the shaft. Further, when the axial tension is increased, the screw portion and nut portion that are used to apply such axial tension must be checked for the rigidity thereof and, at the same time, it becomes more difficult to control the axial tension.

SUMMARY OF THE INVENTION

In view of the above circumstances of the prior art, it is an object of the invention to provide an angular contact ball bearing in which the dimensional conditions of an inner race thereof are designed most suitably to thereby prevent a creep from occurring between the fitting surfaces of the inner race and shaft.

In attaining the above object, there is provided an angular contact ball bearing in which the dimensional conditions of an inner race thereof are designed most suitably so as to be able to prevent the shoulder portion of the inner race from being opened outwardly, thereby preventing a slipping phenomenon from occurring between the inner race and shaft.

The above-mentioned object can be attained by an angular contact ball bearing, according to a first aspect of the present invention, comprising:

an outer race;

an inner race to be mounted on a shaft, the inner race being constituted by a main body portion and a shoulder portion, the inner race having an axially outward end face formed on the shoulder portion, an inner surface portion which is brought in pressure contact with the shaft, an escape portion which is disengaged with the shaft and disposed at a corner of the shoulder portion between the axially outward end face and the inner surface portion, and inner race groove; and a rolling element interposed between the outer race and the inner race groove of the inner race, wherein, in a cross-section along a plane containing an axis of the shaft, a length (L) of the shoulder portion and a length ($r_x$) of the escape portion in the axial direction of the shaft satisfy a relationship of $r_x \leq L \leq 10 r_x$, wherein the length (L) of the shoulder portion is directed to a distance between a first intersecting point at which a line extending along an outer peripheral side surface of the shoulder portion crosses a line extending along the inner race groove toward the outer peripheral side surface, and a second intersecting point at which a line extending along the axially outward end face crosses the line extending along the outer peripheral side face, and wherein the length ($r_x$) of the escape portion is directed to a distance between an a third intersecting point at which the line extending along the axially outward end face crosses a line extending along the inner surface portion and a fourth intersecting point at which the inner surface portion connects to the escape portion.

In the above-mentioned angular contact ball bearing according to the first aspect of the present invention, advantageously, in the cross-section, a height (h) of the shoulder portion in the radial direction of the shaft and an outer diameter ($D_a$) of the rolling element satisfy a relationship of $0.45 D_a \leq h \leq 0.9 D_a$ wherein the height (h) of the shoulder portion is directed to a distance calculated by deducting a thickness (t) of the main body portion from a length between the second intersecting point and the third intersecting point.

Further, in the above-mentioned angular contact ball bearing according to the first aspect of the present invention, advantageously, in the cross-section, the length (L) of the shoulder portion in the axial direction, the length ($r_x$) of the escape portion in the axial direction, and a distance (a) between the third intersecting point and a fifth intersecting point (A) which is defined by intersecting the inner surface portion and a line containing both of a center point of the rolling element and a contact point (Q) where the rolling element contacts with the inner race groove of the inner race satisfy a relationship of $r_x \leq a \leq L$.

In addition, the above-mentioned object can be attained by an angular contact ball bearing, according to a second aspect of the present invention, comprising:

an outer race;

an inner race to be mounted on a shaft, the inner race being constituted by a main body portion and a shoulder portion the inner race having an axially outward end face formed on the shoulder portion, an inner surface portion which is brought in pressure contact with the shaft, an escape portion which is disengaged with the shaft and disposed at a corner of the shoulder portion between the axially outward end face and the inner surface portion, and inner race groove; and a rolling element interposed between the outer race and the inner race, wherein the shoulder portion includes
an axial outside part, which is located axially outside a line which extends in a radial direction of the shaft and contains an intersecting point at which the inner surface portion connects to the escape portion, and
a cut-off portion defined by cutting-off a corner part of the axially outside part which is disposed at a corner between an outer peripheral side face of the shoulder portion and the axially outward end face, in which, in a cross-section along a plane containing an axis of the shaft, a sectional area (S) of the axial outside part and a sectional area (S1) of the cut-off portion satisfy a relationship of $0.1S \leq S1 \leq 0.5S$.

Further, the above-mentioned object can be attained by an angular contact ball bearing, according to a third aspect of the present invention, comprising:

an outer race;

an inner race to be mounted on a shaft, the inner race being constituted by a main body portion and a shoulder portion, a rolling element interposed between the outer race and the inner race, wherein the main body portion has an axially inward end face, an outer peripheral surface engaged with the rolling element, and an inner surface portion engaged with the shaft, wherein the main body portion having an outer chamfered portion (C1) which is formed at a corner between the axially inward end face and the outer peripheral surface and an inner chamfered portion (C2) which is formed at a corner between the axially inward end face and the inner surface portion; and wherein, in a cross-section along a plane containing an axis of the shaft, the height (C1) of the outer chamfered portion and the height (C2) of the chamfered portion in the radial direction of the shaft satisfy the relation $0 \leq C2/C1 \leq 1$.

Furthermore, the above-mentioned object can be attained by an angular contact ball bearing, according to a fourth aspect of the present invention, comprising:

an outer race;

an inner race to be mounted on a shaft, the inner race being constituted by a main body portion and a shoulder portion, and a rolling element interposed between the outer race and the inner race, wherein the main body portion has an axially inward end face, an outer peripheral surface engaged with the rolling element, and an inner surface portion engaged with the shaft, and wherein, in a cross-section along a plane containing an axis of the shaft, the axially inward end face is inclined relative to a line extending in a radial direction of the shaft with an inclination angle $\theta$ in the range of 0.5~5°.

Moreover, the above-mentioned object can be attained by an angular contact ball bearing, according to a fifth aspect of the present invention, comprising:

an outer race;

an inner race to be mounted on a shaft, the inner race being constituted by a main body portion and a shoulder portion, the inner race having an axially outward end face formed on the shoulder portion, an inner surface portion which is brought in pressure contact with the shaft, an escape portion which is disengaged with the shaft and disposed at a corner of the shoulder portion between the axially outward end face and the inner surface portion, and inner race groove; and a rolling element interposed between the outer race and the inner race, wherein, in a cross-section along a plane containing the axis of the shaft, a length ($r_y$) of the escape portion in a radial axial direction of the shaft and a length (i) which is a shortest distance between the inner surface portion and a contact point (Q) at which the rolling element contacts with the inner race groove of the inner race satisfy a relationship of $0.75i \leq r_y \leq 1.25i$.

Still moreover, the above-mentioned object can be attained by an angular contact ball bearing, according to a sixth aspect of the present invention, comprising:

an outer race;

an inner race to be mounted on a shaft, the inner race being constituted by a main body portion and a shoulder portion, and a rolling element interposed between the outer race and the inner race, wherein the main body portion has an axially inward end face, an outer peripheral surface engaged with the rolling element, and an inner surface portion engaged with the shaft, and wherein a thickness (t) of the main body portion in a radial direction of the shaft and a diameter (d) defined by the inner surface portion satisfy a relationship of $0.075d \leq t \leq 0.2d$.

With the angular contact ball bearing according to the present invention, since prevention of the outward opening of the shoulder portion of the inner race can prevent the inner race from floating up, a decrease in the contact surface pressure between the inner race and shaft can be prevented. This can restrict the occurrence of a creep, and also can increase of the life of the angular contact ball bearing.

As shown in FIG. 11, an angular contact ball bearing assembling device is structured such that, when an inner race and a shaft are fitted with each other, in the central fitting portion of the inner race including the neighboring portion of the groove bottom thereof, the inner race is prevented from floating up, which in turn prevents the contact surface pressure from being lowered.

In the angular contact ball bearing assembling device, assuming that the fitting surface shoulder side end portion of the inner race is considered as a center (in FIG. 11(a), a point P), when a axial tension or a ball load is applied to the inner race, a moment to incline the present shoulder side end portion inwardly with respect to the point P may be preferably larger than a moment to incline the present shoulder side end portion outwardly with respect to the point P (in FIG. 11(a), the shoulder side end portion is deformed in such a manner as shown by a broken line).

BRIEF DESCRIPTION OF THE DRAWINGS

FIG. 10 is a graphical representation of the life ratios of a bearing obtained when the thickness of the inner race is changed according to the invention; and, FIGS. 11(a) and 11(b) are views of the contact surfaces of an inner race and a shaft when they are fitted with each other, and the deformed state of the shoulder side end portion of the inner race.

DETAILED DESCRIPTION OF THE PREFERRED EMBODIMENTS

Referring now to a creep phenomenon occurring on fitting surfaces with an interference, there is known a study by Mr. Masaya Imai (Lubrication on the creep of a ball-and-roller bearing, Second Report, in Hard Fitting, Volume 4th, No. 6 (1959), pp307–312). According to his study, if a circumferentially shearing stress produced on the fitting surfaces exceeds a value obtained when a contact surface pressure on the fitting surfaces is multiplied by a friction coefficient, then there is caused a creep phenomenon. Therefore, to prevent such creep phenomenon, it is effective to increase the contact surface pressure on the fitting surfaces as much as possible.

Figure 2:
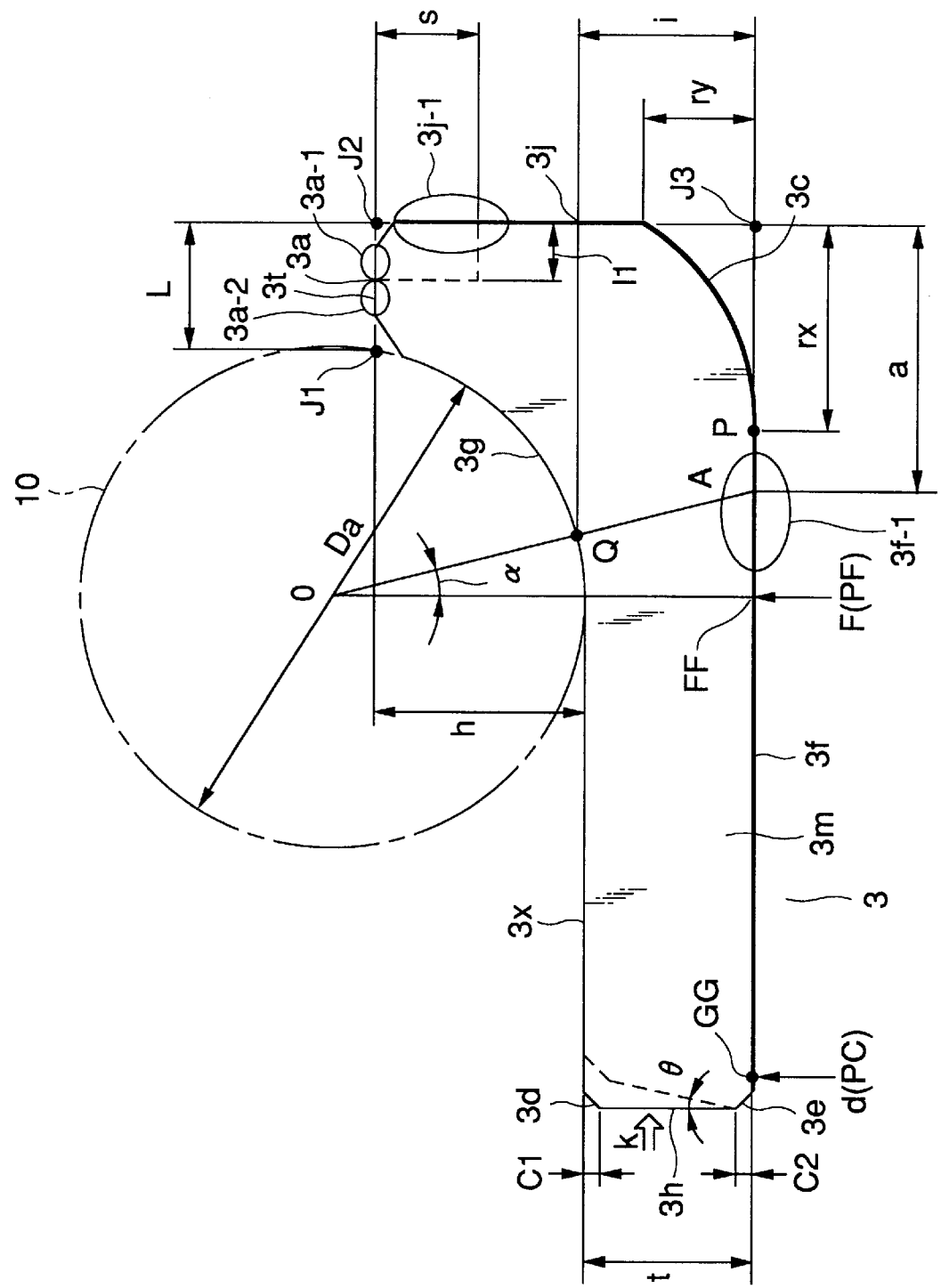
FIG. 2 is a schematic view of an inner race and a ball employed in the angular contact ball bearing according to the invention.
Figure 3:
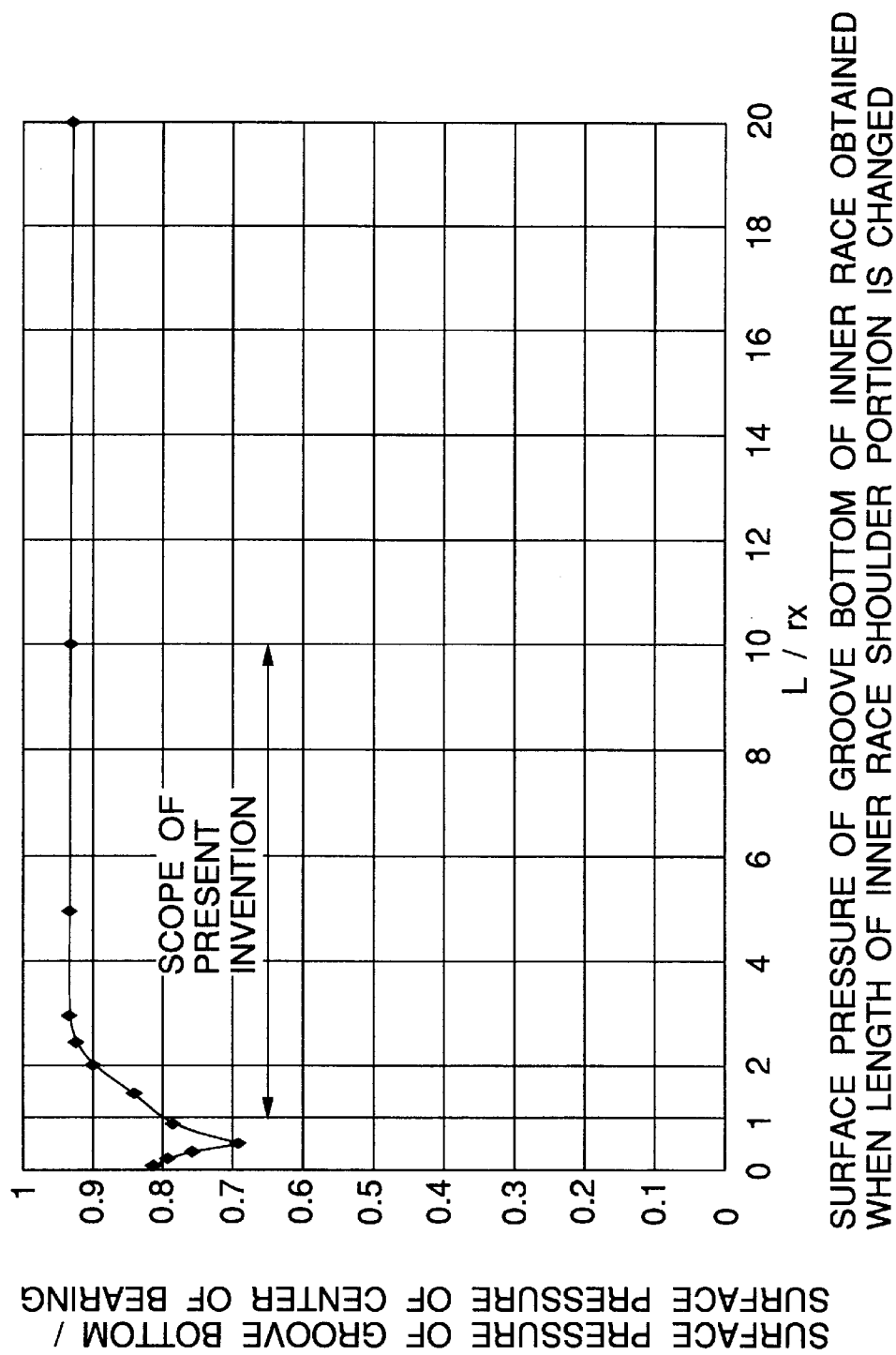
FIG. 3 is a graphical representation of the surface pressures of the groove bottom of the inner race obtained when the length of the shoulder portion of an inner race is changed according to the invention.

In view of the above, the present inventors have analyzed the fitting surfaces of a bearing for a vehicle wheel in detail, using the FEM (Finite Element Method). With reference to FIG. 2, the contact surface pressure on the fitting surfaces is high locally at a point P where the escape portion 3c of the end portion of the inner race and the inside diameter surface 3f of the inner race intersect each other, but the contact surface pressure on the fitting surfaces is gradually lowered and shows the minimum value in the neighborhood of a point F corresponding to the groove bottom of the inner race. Now, FIG. 3 shows the lowering state of the contact surface pressure in the neighborhood of the point P. If there is present the escape portion 3c in the end portion of the inner race, then the inner race 3 is not contacted with the shaft at the axial position of the inner race shoulder portion 3a, so that an outwardly opening (in FIG. 2, clockwise opening) moment is applied to the point P. For this reason, the end face of the inner race is inclined and, at the same time, on the fitting surfaces, the inner race is caused to float up, thereby lowering the contact surface pressure. That is, according to our analysis, it is found that the inner race is easy to slip in the area where the contact surface pressure is low, namely, the creep is easy to occur in such low contact surface pressure area.

To prevent the occurrence of the creep, it is necessary to prevent the lowering of the contact surface pressure due to the float-up of the inner race in the fitting surface area thereof.

(First Embodiment)

Now, description will be given below of a first embodiment of an angular contact ball bearing according to the invention with reference to FIGS. 1, 2 and 3.

Figure 1:
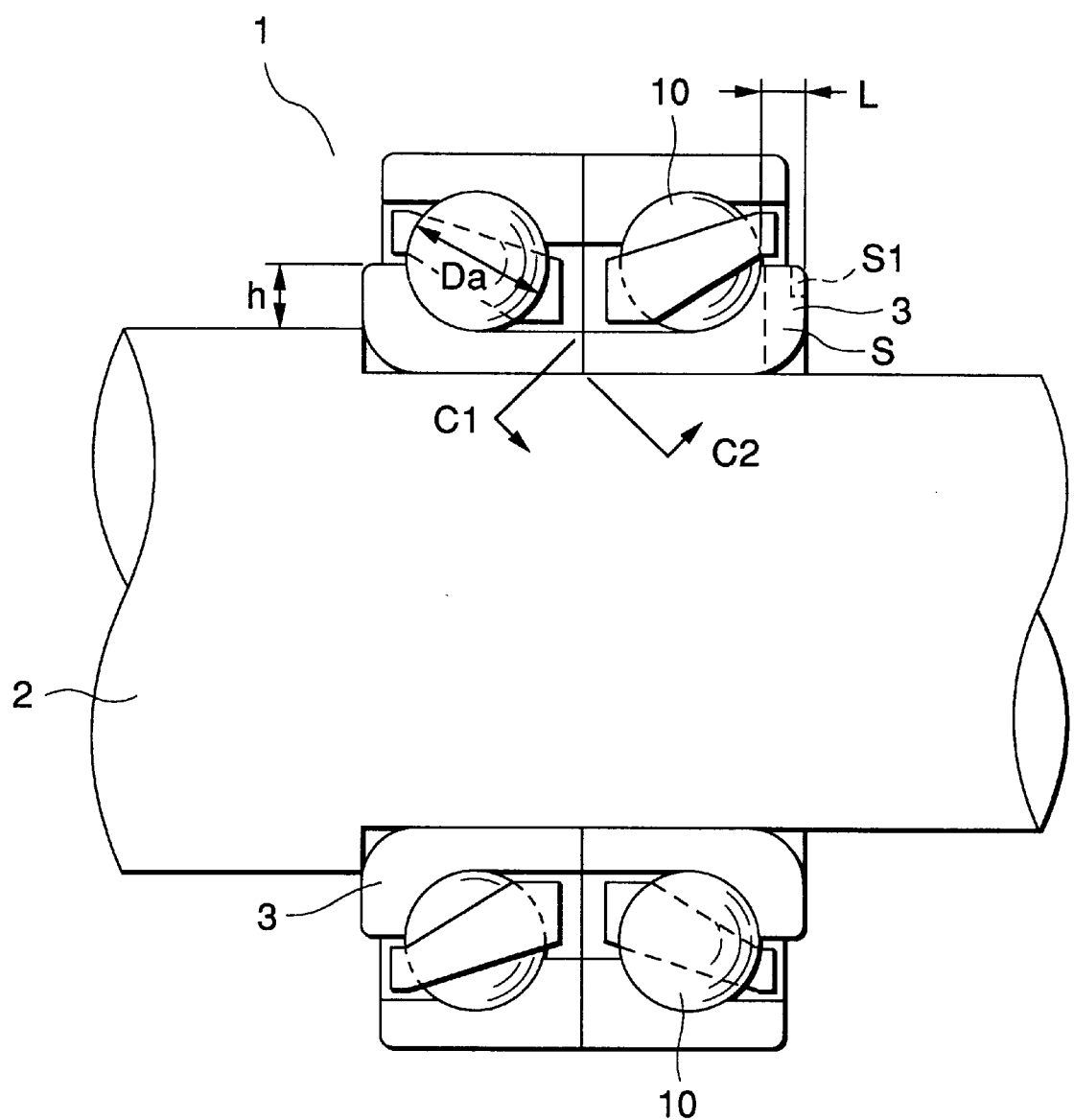
FIG. 1 is a general structure view of an angular contact ball bearing according to the invention.

As shown in FIGS. 1 and 2, the angular contact ball bearing is mainly constituted by an outer race; an inner race to be mounted on a shaft, the inner race being constituted by a main body portion 3m and a shoulder portion 3a, the inner race having an axially outward end face 3j formed on the shoulder portion 3a, an inner surface portion 3f which is brought in pressure contact with the shaft, an escape portion 3c which is disengaged with the shaft and disposed at a corner of the shoulder portion 3a between the axially outward end face 3j and the inner surface portion 3f, and inner race groove 3g; and a rolling element interposed between the outer race and the inner race groove 3g of the inner race.

FIG. 3 shows the surface pressures of the groove bottom of the inner race obtained when the length L of the shoulder portion of the inner race is changed.

When a seal is disposed externally of the bearing, that is, when sealing is enforced outside the bearing unit, and, at the same time, when $1 \leq L/r_x \leq 20$, according to the FEM calculation results, the contact surface pressure of the inner race groove bottom provides the smallest value in the neighborhood of $L/r_x=0.5$.

Here, L expresses a distance between two intersecting points which can be obtained in the following manner: that is, while the shoulder portion 3a of the inner race 3 is not chamfered, in the section of FIG. 2, the inner race groove 3g is extended toward the outer peripheral side thereof, the inner race shoulder portion 3a is extended in the axial direction thereof, and the inner race end portion 3i is extended toward the outer peripheral side thereof, so that they intersect each other at the above two points. Here, $r_x$ expresses the axial length of the escape portion of the side face of the inner race.

Namely, in other words, the length L of the shoulder portion 3a is directed to a distance between a first intersecting point J1 at which a line extending along an outer peripheral side surface 3t of the shoulder portion 3a crosses a line extending along the inner race groove 3g toward the outer peripheral side surface 3t, and a second intersecting point J2 at which a line extending along the axially outward end face 3j crosses the line extending along the outer peripheral side face 3t, and also the length $r_x$ of the escape portion 3c is directed to a distance between an a third intersecting point J3 at which the line extending along the axially outward end face 3j crosses a line extending along the inner surface portion 3f and a fourth intersecting point P at which the inner surface portion 3f connects to the escape portion 3c.

In addition, the surface pressure of the inner race groove bottom is a contact surface pressure produced between the inner race 3 and the shaft 2 at an intersecting point FF where, in the section of FIG. 2, a line drawn perpendicularly from the center O of a ball 10 to the inner surface portion 3f of the inner race intersects the inner surface portion 3f of the inner race.

The reason why $L/r_x$ is defined is that, since the groove bottom surface pressure varies depending on the magnitude of the moment around the point P, the magnitude of the moment is determined mainly by L and $r_x$.

The reason why the surface pressure of the groove bottom is the smallest in the neighborhood of $L/r_x$=0.5 is as follows: That is, the portion of the shoulder portion that is located outwardly of the point P produces an outwardly opening moment with respect to the point P, whereas the portion of the shoulder portion that is located inwardly of the point P produces an inwardly inclining moment with respect to the point P. When $1<L/r_x$, the inwardly inclining moment with respect to the point P becomes larger when compared with $L/r_x=1$, thereby cancelling the outwardly opening moment, with the result that the inner race is prevented from opening outwardly. Also, $L/r_x$ is a value near 0 (such as 0.1, or 0.2), the section area of the portion of the shoulder portion that is located outwardly of the point P decreases and thus the outwardly opening moment with respect to the point P decreases. From these facts, it is found that a difference between the outwardly opening moment with respect to the point P and the inwardly inclining moment with respect to the point P is the largest in the range of $0 \leq L/r_x \leq 1$. In the current calculation example, because a difference between the outwardly opening moment and the inwardly opening moment is the greatest in the vicinity of $L/r_x$=0.5, the surface pressure of the groove bottom (PF)/the surface pressure of the center of the bearing (PC), that is, Pr is the smallest.

In the range of $L/r_x \leq 1$, since the contact surface pressure decreases suddenly, $r_x \leq L$ is preferred. Especially, when the seal is present within the interior portion of the bearing, because there is room for the L dimension, $2 \leq L/r_x$ is desirable. Further, if the L dimension is increased, then the rigidity of the bearing is lowered and, therefore, $L/r_x \leq 10$ is practically effective.

Here, the surface pressure d of the center of the bearing means a contact surface pressure between the inner race and shaft at a position GG located slightly inwardly (in FIG. 2, on the right side) of an intersecting point where, in FIG. 2, a chamfered portion 3e, which is present on the left of the axially outward face 3j of the inner race, and the inner surface portion 3f of the inner race intersects each other. That is, since, at the intersecting point between the chamfered portion 3e and the inner race inside diameter 3f, there is a possibility that an edge load can be generated, a contact surface pressure at a position where no edge load can be generated (namely, a contact surface pressure at a position double the length of the axial-direction chamfered portion from the end face of the inner race) is used as the surface pressure of the center of the bearing.

The reason why the rigidity of the bearing is lowered in the range of $10<L/r_x$ is as follows: That is, because there is a limit to the axial length of the inner race, if the L dimension is increased, then the distance between balls in the outer array and in the inner array is shortened. And, since a transverse road surface reaction is applied to a tire, a moment is applied to the bearing. In fact, the shorter the distance between the balls is, the larger the load applied to the bearing is, which causes the rigidity of the bearing to lower.

Figure 11A:
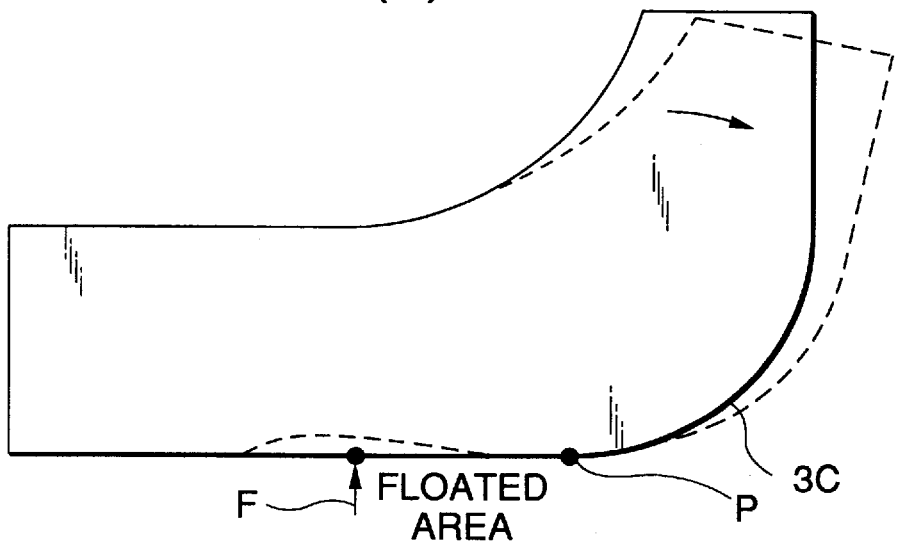
Figure 11B:
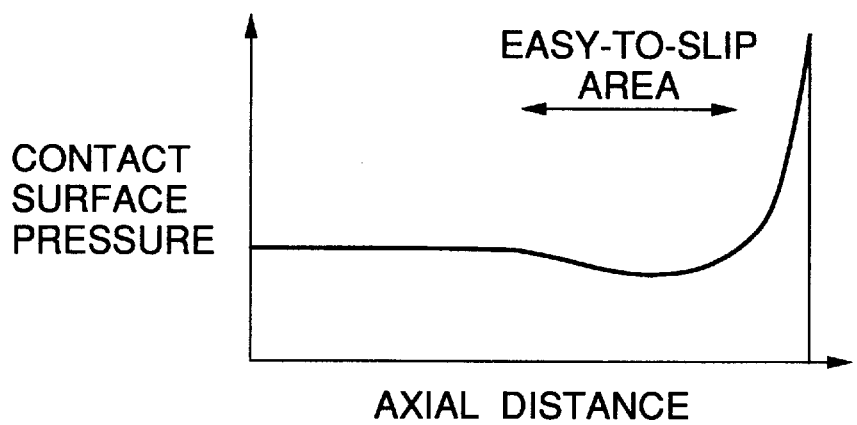

In the present embodiment, the length L of the inner race shoulder portion 3a is set larger than the length $r_x$ of the escape portion 3c of the inside diameter end portion of the inner race. This can prevent the surface pressure from lowering in the vicinity of the point F. If the shoulder portion 3a of the inner race is opened outwardly with the point P as the center thereof, the point F is caused to float up in such a manner as shown by a broken line, so that the surface pressure of the inner race groove bottom at the point F is caused to decrease (FIG. 11(b)). If the length L of the inner race shoulder-portion 3a is shorter than the length $r_x$ of the escape portion 3c along the inside diameter end portion 3f of the inner race, the portion of the shoulder portion 3a that is located outside of the point P produces an outwardly opening moment with respect to the point P; but, by increasing the length L of the shoulder portion 3a, there is produced an inwardly inclining moment with respect to the point P. This can prevent the lowered surface pressure caused by the floating-up of the inner race.

And, the portion of the shoulder portion 3a that is located axially outside of the point P produces an outwardly opening moment with respect to the point P; but, on the contrary, the portion of the shoulder portion 3a that is located axially inside of the point P produces an inwardly inclining moment with respect to the point P. When $L/r_x$ increases, then the length $r_x$ decreases with respect to the L dimension. That is, the section area of the shoulder portion 3a that is located axially outside of the point P decreases and the outwardly opening moment with respect to the point P is thereby caused to decrease.

However, when the length L decreases and the section area of the portion outside of the point P decreases, that is, when $L/r_x$ decreases, the outwardly opening moment with respect to the point P decreases and thus the surface pressure of the inner race groove bottom shown in FIG. 3 is prevented from decreasing.

Therefore, when $L/r_x$=0.2, (PF/PC) becomes on the order of 0.8. When $L/r_x$=0.5 or so, (PF/PC) becomes the smallest. And, as $L/r_x$ increases, (PF/PC) increases; and, when $L/r_x$ is in the vicinity of 3.0 or more, (PF/PC) becomes constant. That is, this is a desired area from the viewpoint of (PF/PC).

However, if $L/r_x$ exceeds 10, then it is necessary to set small the dimension of the distance between the operation points, which lowers the rigidity (bending property) of the bearing unit, thereby reducing the life of the bearing unit. The reason why $1 \leq L/r_x$ is employed is as follows: That is, if $L/r_x$ is set smaller than 1, then in the vicinity of $L/r_x$=0.5, (PF/PC) is small and is thereby unstabilized. Therefore, by employing $1 \leq L/r_x$, (PF/PC) can be made to rise or can be set in a stabilized and high area.

(Second Embodiment)

Figure 4:
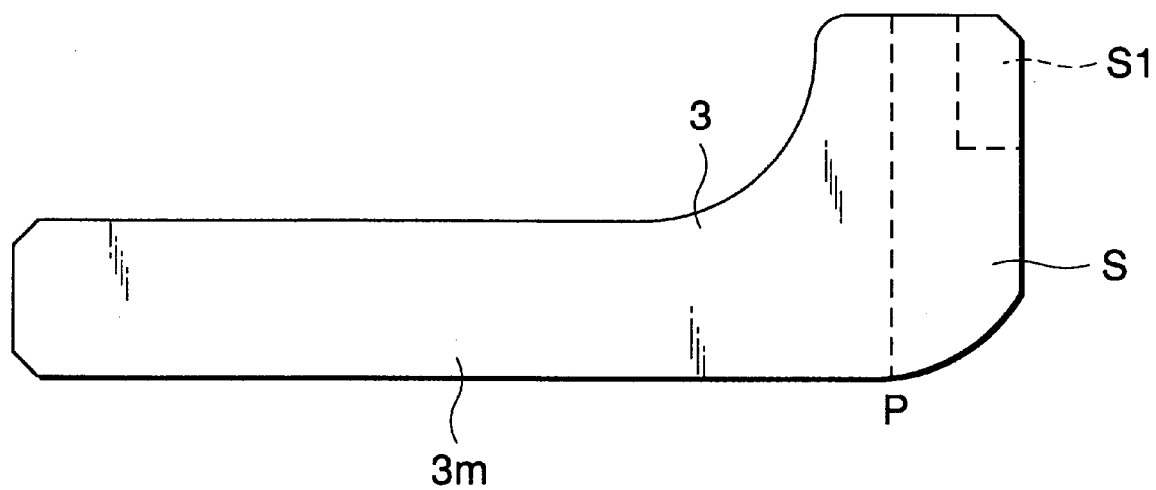
FIG. 4 is a view of a second embodiment of an inner race according to the invention.

Next, description will be given below of a second embodiment of an angular contact ball bearing according to the invention with reference to FIGS. 4 and 5.

In the present embodiment, the shoulder portion of the inner race is cut off from the end face side thereof, thereby providing $L/r_x=1$. As the cutting ratio increases, the surface pressure of the inner race groove bottom increases. To reduce an outwardly opening moment with respect to the point P, the portion of the shoulder portion that is located outside the point P may be cut off. In FIG. 4, the moment reducing amount depends on the amount of the portion to be cut off from the section area S of the portion of the shoulder portion that is located outside the point P. Here, the cutting ratio is a ratio of S1/S, where the section area of the portion of the shoulder portion that is located outside the point P is expressed as S, and the section area of the portion to be cut is expressed as S1.

S1 is the section area that is cut off from the outer peripheral side of the end face of the inner race shoulder portion. Referring to the effect of the present embodiment, in particular, when the cutting ratio is 50% or less, that is, when $S1/S \leq 0.5$, a striking effect can be gained. Also, if $0.5<S1<S$, then the strength of the inner race shoulder portion is lowered.

Figure 5:
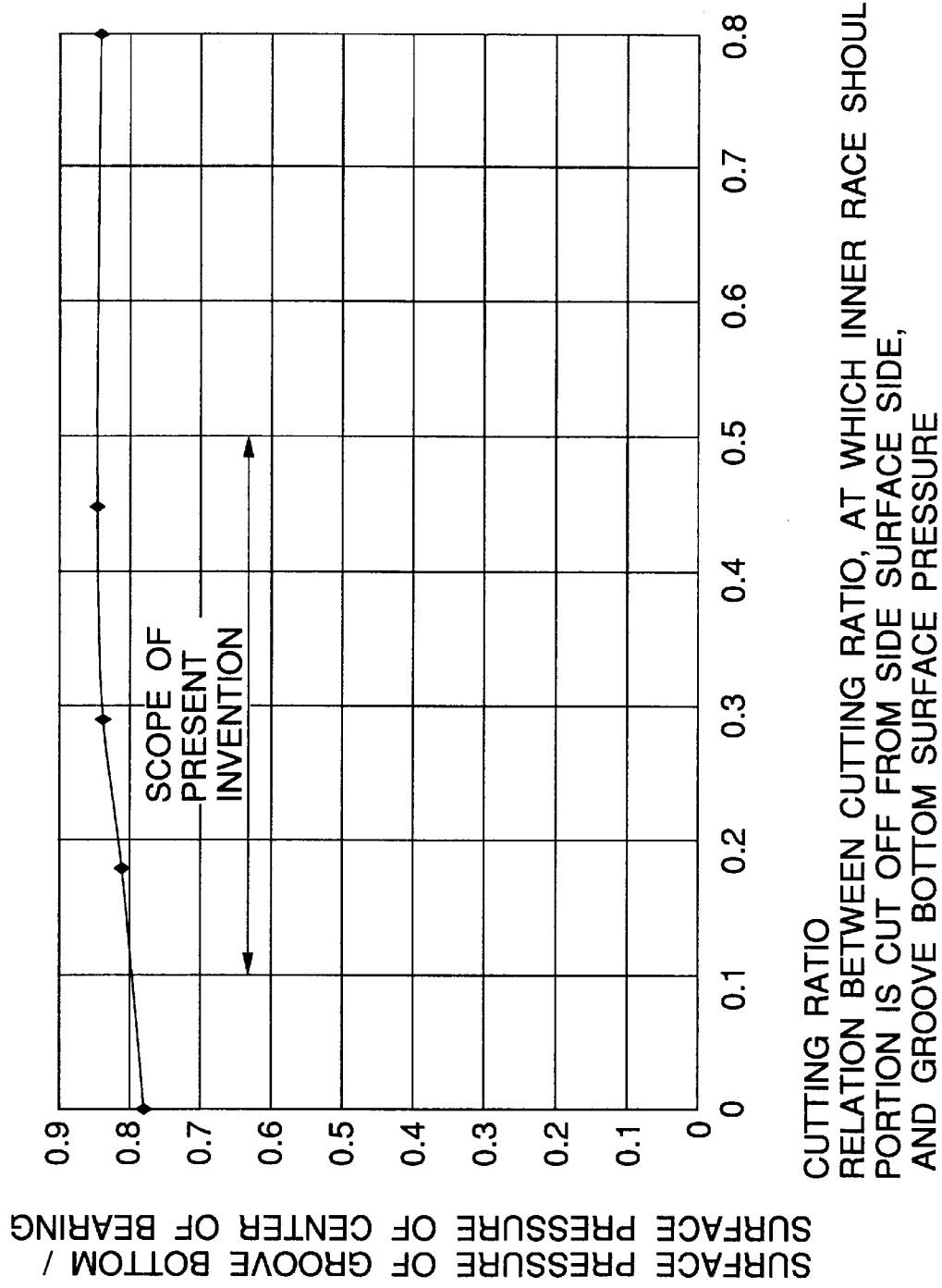
FIG. 5 is a graphical representation of the relation between a cutting ratio, at which the shoulder portion of an inner race is cut off from the side surface side thereof, and the surface pressure of the groove bottom of the inner race according to the invention.

And, if the area to be cut increases, the thickness of the inner race shoulder portion in the axial direction thereof decreases to thereby lower the strength of the inner race; and, in the range of $0<S1/S<0.1$, as can be seen from FIG. 5, even if the inner race shoulder is cut, a cutting effect cannot be expected so much. Also, when the surface pressure of the inner race groove bottom is lowered, the limit of the lowered pressure may preferably be $0.8 \leq (PF/PC)$ and, therefore, in the present embodiment, $0.1 \leq S1/S$ is employed.

In other words, the inner race of the second embodiment is provided with the shoulder portion 3a which includes an axial outside part, which is located axially outside a line which extends in a radial direction of the shaft and contains an intersecting point P at which the inner surface portion 3f connects to the escape portion 3c, and a cut-off portion defined by cutting-off a corner part of the axially outside part which is disposed at a corner between an outer peripheral side face 3t of the shoulder portion 3a and the axially outward end face 3j, in which, in a cross-section along a plane containing an axis of the shaft, a sectional area S of the axial outside part and a sectional area S1 of the cut-off portion satisfy a relationship of $0.1S \leq S1 < 0.5S$ In the second embodiment, the inner race shoulder portion 3a is formed stepwise in the axial direction. In this case, there can be provided an effect that an outwardly opening moment caused by the inner race shoulder portion 3a can be relieved. The length L of the shoulder portion 3a is greater than the length $r_x$ of the axial-direction escape portion 3c of the inside diameter end portion of the inner race. Here, if the height of the portion 3a-2 of the shoulder portion 3c that is located inwardly of the point P in the axial direction is increased and the height of the outside portion 3a-1 is lowered, then the outwardly opening moment can be reduced and the inwardly acting moment can be increased, which makes it possible to prevent the lowered surface pressure that could be caused by the floating-up of the inner race. Alternatively, if the shoulder portion 3a is inclined in the axial direction thereof instead of being formed stepwise to thereby lower the height of the 3a-1 portion, then there can also be obtained a similar effect to the above.

(Third Embodiment)

Next, description will be given below of a third embodiment of an angular contact ball bearing according to the invention with reference to FIG. 6.

In the present embodiment, in addition to the condition employed in the previously described first embodiment, that is, $1.0 \leq L/r_x < 10$, there is employed another condition $0.45 \leq h/Da \leq 0.9$.

Note that Da denotes an outer diameter of the ball 10, and the height h of the shoulder portion 3a is directed to a distance calculated by deducting a thickness t of the main body portion 3m from a length between the second intersecting point J2 and the third intersecting point J3.

The FEM calculation results show that, as h/Da increases, the contact surface pressure at the point P increases. Therefore, the higher h/Da is, the better the effect is. To increase the contact surface pressure at the point P means to increase the surface pressure of the area existing between the points P and F; and, therefore, for the purpose of prevention of a creep, the value of the surface pressure at the point P may preferably be high. However, in order to prevent the ball from running up onto the inner race shoulder portion 3a, $0.45 \leq h/Da$ is desirable. Also, in order to prevent the inner race from interfering with an outer race, $h/Da \leq 0.9$ is preferred. Further, at the then time, preferably, $1 \leq L/r_x \leq 10$ may be employed. Here, the reason why the condition is set using h/Da is that the magnitude of h depends most on Da.

Figure 6:
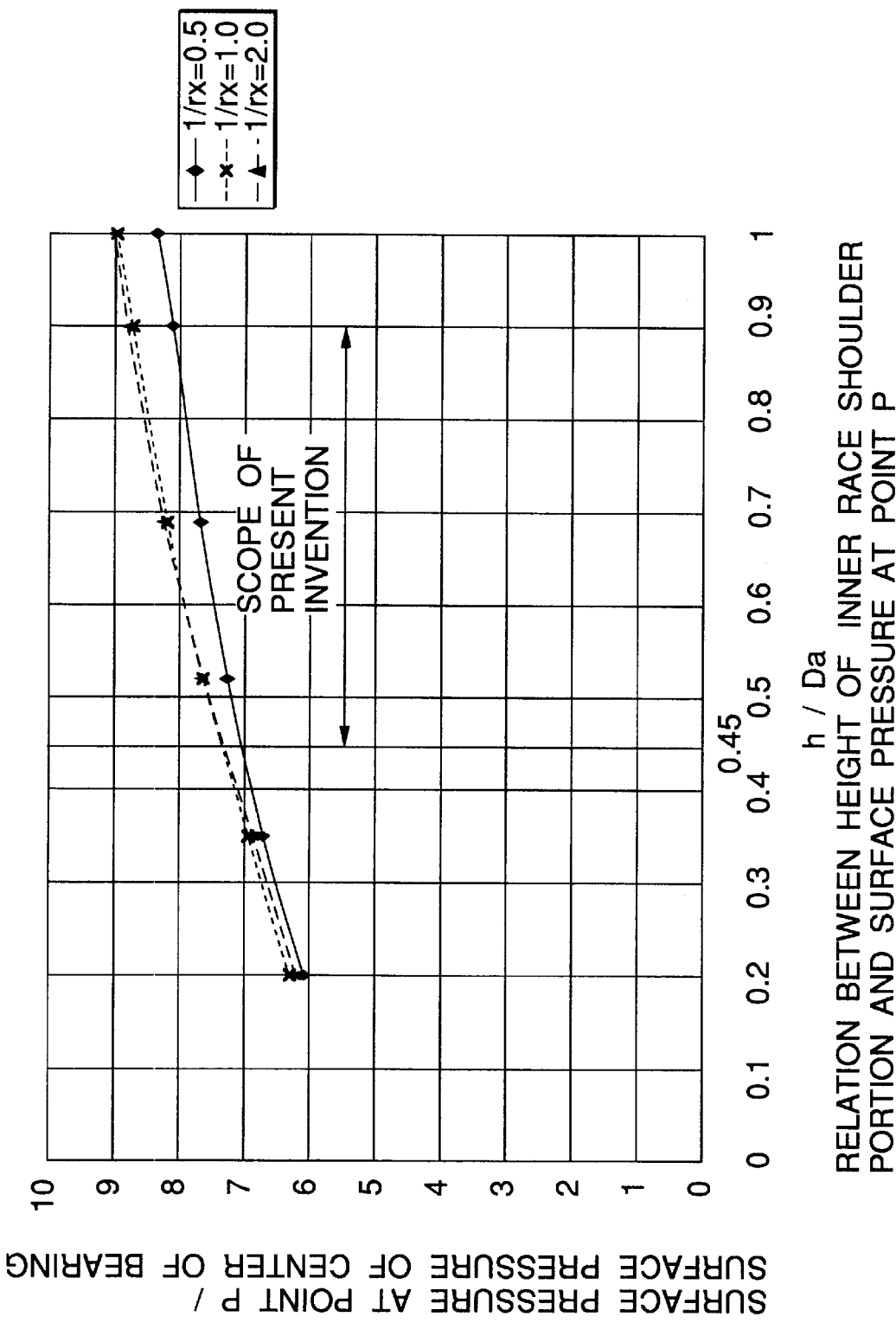
FIG. 6 is a graphical representation of the relation between the height of the shoulder portion of an inner race and a surface pressure obtained at a point P according to the invention.

In a calculation example ($L/r_x=0.5$, 1.0, 2.0) shown in FIG. 6, in the range of $0.2 \leq h/Da \leq 1$, the surface pressure of the inner race groove bottom shows almost a constant value, which means that there can be found no effect in increasing the surface pressure of the inner race groove bottom. However, if h/Da increases, then the contact surface at the point P increases.

Without limiting the condition to $1 \leq L/r_x \leq 10$, if (h/Da) is increased in the range of $L/r_x<1$, then the contact surface at the point P increases but, on the contrary, the surface pressure of the inner race groove bottom decreases.

In the present embodiment, by setting the length L of the inner race shoulder portion 3a greater than the length $r_x$ of the axial-direction chamfered portion of the inside diameter end portion of the inner race as well as by increasing the height h of the inner race shoulder portion 3a, the contact surface pressure of the fitting surfaces is allowed to increase. The height h of the shoulder portion 3a depends almost on the cost thereof and, in the case of a bearing with a seal, on the size of the seal; and, actually, the height h of the shoulder portion 3a is designed with a minimum value which can prevent the projection of a contact area between the ball and inner race groove. At the present time, the height h from the inner race groove bottom portion 3g to the inner race shoulder portion 3a is designed in connection with the relation with respect to the ball diameter Da. However, the FEM analysis shows that, if the height h of the inner race shoulder portion 3a is increased up to the range of 0.45 to 0.9 times the ball diameter Da, then the inner race can be prevented from floating up in the fitting surface portion thereof and thus the contact surface pressure can be effectively prevented from lowering. The height of the inner race shoulder portion is limited by its interference with the outer race. The above effect is effective only when the length L of the shoulder portion is greater than the length $r_x$ of the axial-direction chamfered portion of the inside diameter end portion of the inner race; and, on the contrary, when the length L of the shoulder portion is shorter than the length $r_x$, there is provided the opposite effect.

(Fourth Embodiment)

Next, description will be given below of a fourth embodiment of an angular contact ball bearing according to the invention which comprise an outer race; an inner race to be mounted on a shaft, the inner race being constituted by a main body portion 3m and a shoulder portion 3a, and a rolling element interposed between the outer race and the inner race, wherein the main body portion 3m has an axially inward end face 3h, an outer peripheral surface 3x, and an inner surface portion 3f engaged with the shaft, as shown in FIGS. 1 and 2. In the fourth embodiment, the main body portion 3m has an outer chamfered portion C1 which is formed at a corner between the axially inward end face 3h and the outer peripheral surface 3x and an inner chamfered portion C2 which is formed at a corner between the axially inward end face 3h and the inner surface portion 3f. Further, in a cross-section along a plane containing an axis of the shaft, the height C1 of the outer chamfered portion and the height C2 of the chamfered portion in the radial direction of the shaft is set to satisfy the relation $0 \leq C2/C1 \leq 1$.

In this fourth embodiment, as described above, there is employed a condition $0 \leq (C2/C1) \leq 1$. Here, C1 expresses the height of a chamfered portion 3d which is located on the left side of the inner peripheral end face of the inner race in FIG. 2, while C2 expresses the height of a chamfered portion 3e which is located on the right side of the inner peripheral end face of the inner race. If the axial tension is applied to the end portion of the inner race, then there is produced an outwardly opening moment around the point P. When (C2/C1)=1, there is applied onto the point P an outwardly opening moment which is almost equal to a moment obtained when neither C1 nor C2 is chamfered. When C2/C1<1, the axial tension is applied more to the inner periphery side of the inner race end face than the center of the inner race end face and, for this reason, when compared with the condition (C2/C1)=1, the outwardly opening moment is small. Therefore, $C2/C1 \leq 1$ is preferred.

The present embodiment shows an embodiment when the length C1 of the chamfered portion 3d located on the left side of the inner peripheral end face of the inner race is greater than the length C2 of the chamfered portion 3e located on the right side of the inner peripheral end face of the inner race. The axial tension is applied to the inner race in the axial direction so that the inner race is fixed. By allowing the operation position k of the axial tension to approach the shaft as near as possible, the moment around the point P can be reduced. That is, according to the fourth embodiment, the lowering of the contact surface pressure caused by the floating-up of the inner race can be prevented in this manner.

(Fifth Embodiment)

Next, description will be given below of a fifth embodiment of an angular contact ball bearing according to the invention.

In the present embodiment, the end face 3h of the inner race 3 is inclined. The fifth embodiment differs from the fourth embodiment in this respect. The inclination of the axially inward end face 3h is inclined relative to a line outwardly extending in a radial direction of the shaft with an inclination angle θ. In the fifth embodiment as well, similarly to the fourth embodiment, since the moment around the point P can be reduced, the lowering of the contact surface pressure due to the floating-up of the inner race can be prevented. If the other member to be contacted with the inner race end face 3h is so formed as to have an inclination corresponding to the inclination of the inner race end face 3h, there is produced an inwardly acting moment around the point P, which is more effective in preventing the lowering of the contact surface pressure. That is, this allows the position of the operation point to approach the inner race inside diameter, so that the same operation effect as in the fourth embodiment can be provided. The inclination angle θ may preferably be in the range of 0.5~5°. This angle θ is an angle which is formed from the inside diameter side toward the outside diameter side.

In the present embodiment, similarly to the fourth embodiment, there is employed the condition $0 \leq (C2/C1) < 1$. If the axial tension is applied to the inner race end portion, then there is produced an outwardly opening moment around the point P. When (C2/C1)=1, an outwardly opening moment, which is almost equivalent to a moment obtained when neither C1 nor C2 is chamfered, is applied to the point P.

When (C2/C1)<1, since the axial tension is applied more onto the inner periphery side of the inner race end face than the center of the inner race end face, the outwardly opening moment is smaller than when (C2/C1)=1. Therefore, (C2/C1)<1 is preferred.

(Sixth Embodiment)

Next, description will be given below of a sixth embodiment of an angular contact ball bearing according to the invention.

In the sixth embodiment, in addition to the condition of $1 \leq L/r_x < 10$ as recited in the first embodiment, in a cross-section along a plane containing an axis of the shaft, the length L of the shoulder portion 3a in the axial direction, the length $r_x$ of the escape portion 3c in the axial direction, and a distance a between the third intersecting point J3 and a fifth intersecting point A which is defined by intersecting the inner surface portion 3f and a line containing both of a center point of the rolling element and a contact point Q where the rolling element contacts with the inner race groove 3g of the inner race are set to satisfy a relationship of $r_x \leq a \leq L$.

In FIG. 2, as an intersecting point A between a straight line, which extends from the center 0 of the ball 10 through a contact point Q between the ball and the inner race groove of the inner race toward the inner race inside diameter surface, and the inner race inside diameter surface is situated more inward (leftward) in the axial direction, the radial load becomes larger.

Here, a life ratio L0 is defined in the following manner. That is, $$L0 = (C0/P0)^3 \qquad (1)$$

where, C0 expresses a basic movement rate load (kgf) and P0 expresses a movement equivalent load (kgf).

$$C0 = f_c (\cos \alpha)^{0.7} z^{2/3} Da^{1.8} \qquad (2)$$

where, $f_c$ is a coefficient to be decided by the shapes, working precision, and materials of the respective portions of the bearing, in particular, in an angular contact ball bearing, normally, $f_c$ takes the value of 5~6; and, z is the number of balls.

To increase a with $r_x$ fixed, that is, to increase $a/r_x$ means to decrease α. Here, α is a contact angle between the ball 10 and inner race 3. If α decreases, then C0 increases according to the above equation (2). However, if α decreases, then a radial component increases and thus P0 increases. When C0 and P0 are compared with each other, in the current calculation example, the influence of P0 becomes stronger and L0 is becomes shorter. That is, the surface pressure increases, whereas the life of the bearing is shortened. Also, if the distance a is made to increase, then the length L also increases, the moment increases with respect to an external force, and P0 increases, thereby shortening the life of the bearing. And, if the distance a is made to decrease, then a thrust component increases and thus the outwardly opening moment increases. Therefore, the condition must be $1.0 \leq (a/r_x)$.

Figure 7:
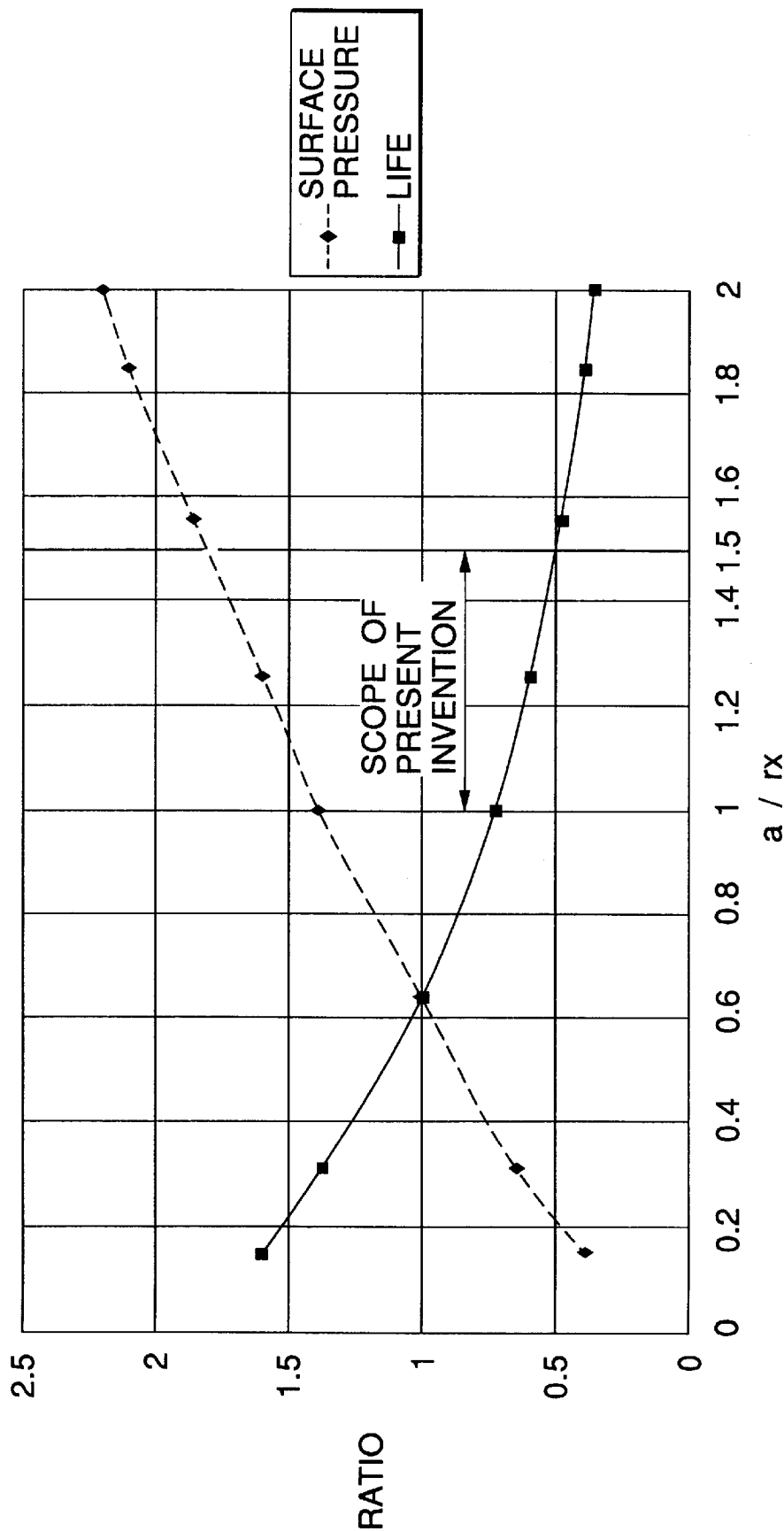
FIG. 7 is a graphical representation of the relation between the position of a point A, a surface pressure ratio, and a bearing life ratio according to the invention.
Figure 8:
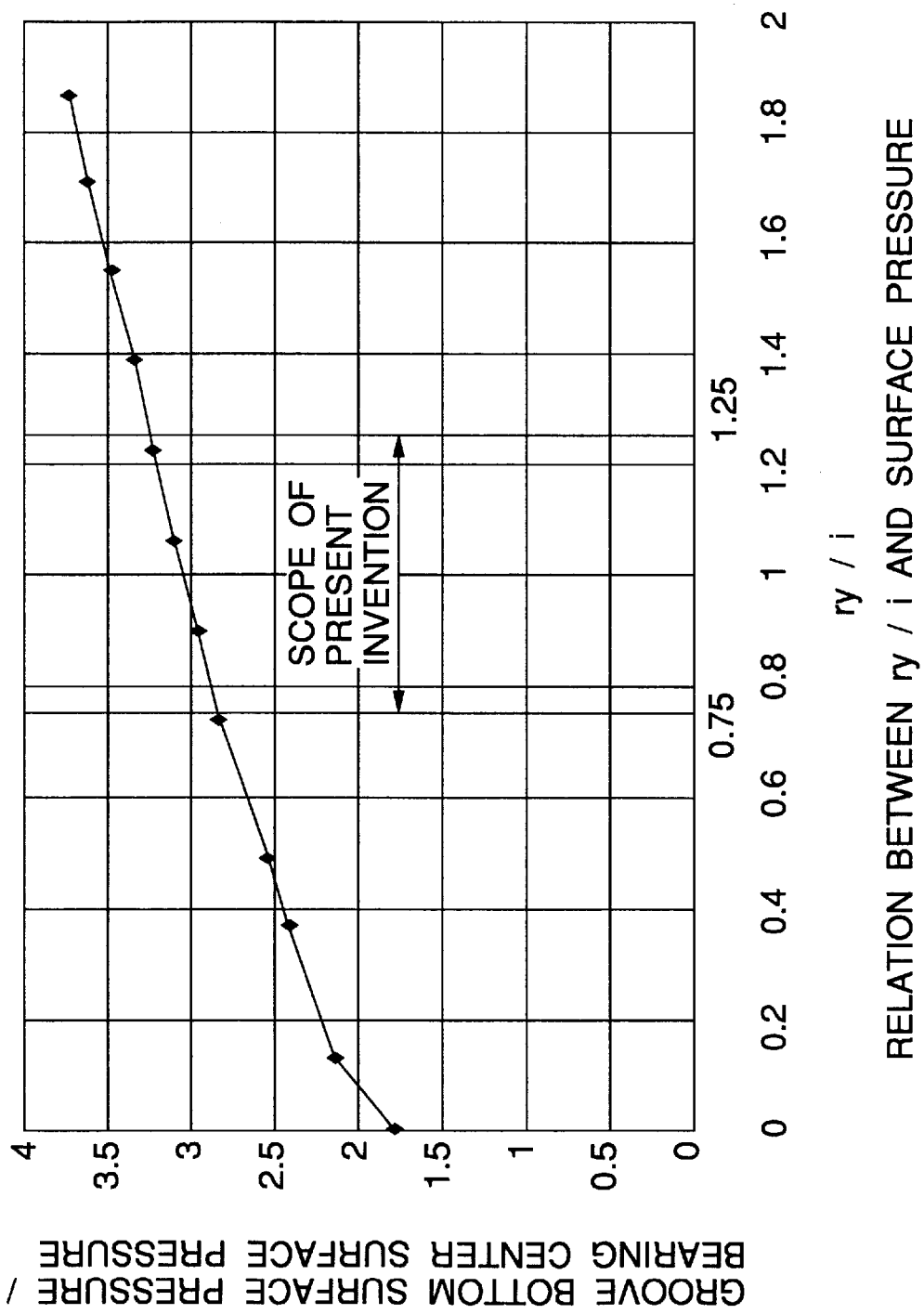
FIG. 8 is a graphical representation of the relation between $r_y/i$ and the surface pressure of the groove bottom of the inner race according to the invention.

If a<L, then as the a increases with respect to the length L, the distance between the operation points decreases. If a car turns, then a transverse road surface reaction is applied to the tire of the car and a moment is applied to the bearing. The shorter the distance between the operation points is, the greater the bearing load due to the moment is. If the bearing load increases, then the life of the bearing is undesirably shortened. Therefore, it is not desirable that the distance between the operation points is shortened. A desired distance between the operation points can be obtained when a<L. According to the FEM calculation results, when a rolling member load is applied, as the point A is located further inside the point P, the surface pressure of the inner race groove bottom increases. However, as the point A is located further inside the point P, the radial load increases to thereby shorten the life of the bearing. In the example shown in FIG. 7, there is shown a case obtained when $L/r_x=1.5$. If $a/r_x$ increases, then the life of the bearing is shortened.

When $L/r_x=1.5$, the range of up to a=L is preferred. If the rolling member load is applied in the range of $a<r_x$, an outwardly opening moment is applied to the point P to thereby lower the surface pressure of the inner race groove bottom. On the other hand, in the range of $r_x \leq a$, an inwardly inclining moment is applied to the point P. Therefore, $r_x<a$, that is, $1 \leq (a/r_x)$ is preferable.

From the foregoing analysis, the range of $r_x \leq a \leq L$ is preferable.

The present embodiment is an embodiment in which the distance a between the position A, at which the straight line OQ connected from the ball center O to the operation point position Q on the shaft axis intersects the inner race inside diameter 3f, and the end face of the bearing is longer than the length $r_x$ of the axial-direction chamfered portion of the inside diameter end portion of the inner race. In this embodiment, due to the contact load from the ball, there is produced an inwardly acting moment around the point P. Therefore, even if the inner race is caused to float up and the contact surface pressure is thereby lowered, the load from the ball increases the contact surface pressure in the fitting surface thereof to thereby be able to prevent the occurrence of the creep. By the way, when the length L of the inner race shoulder portion is longer than the length $r_x$ of the axial-direction chamfered portion of the inside diameter end portion of the inner race and, at the same time, when $r_x \leq a \leq L$, there can be obtained a greater effect.

(Seventh Embodiment)

Next, description will be given below of a seventh embodiment of an angular contact ball bearing according to the invention.

In the present embodiment, the length $r_y$ of the chamfered portion 3c of the side face of the inner race and the length i from the inner surface portion 3f of the inner race to a contact point Q between the ball and the inner race groove of the inner race satisfy the relation $0.75i \leq r_y \leq 1.25i$.

In other words, in a cross-section along a plane containing the axis of the shaft, a length $r_y$ of the axially chamfered (escape) portion 3c in a radial axial direction of the shaft and a length i which is a shortest distance between the inner surface portion 3f and a contact point Q at which the rolling element contacts with the inner race are set to satisfy a relationship of $0.75i \leq r_y \leq 1.25i$.

If the axial tension is to be applied from the end portion 3i of the inner race is as distant as possible from the point P, then the inwardly acting moment around the point P becomes larger, which makes it possible to prevent the lowered contact surface pressure that could be caused by the floating-up of the inner race. For this reason, it is effective that the axial tension is applied from the upper portion of the inner race end portion 3i located near the shoulder portion 3a of the inner race. However, if the inwardly acting moment is excessively large, then the inner race groove portion 3g is deformed, thereby causing a danger that the contact portion Q can vary or the ball load can increase. To prevent such danger, effectively, the axial tension may be applied in an area ranging from the neighborhood of the contact point Q to the inner race upper portion 3j-1. In this case, even if a large axial tension is applied from the inner race upper portion 3j-1, the deformation of the groove portion 3g can be minimized. It is not practical from the viewpoint of the cost that, in a member used to hold the shaft or inner race, there is formed an escape portion to thereby change the butting position of the bearing end face 3j; but, on the other hand, it is proper that, by increasing the length $r_y$ of the chamfered portion 3c of the side face of the inner race, the butting position of the bearing end face 3j can be changed to the position 3j-1. When taking the cost and working accuracy into account, the range of $0.75i \leq r_y \leq 1.25i$ is practically proper.

According to the results of the FEM calculation, the larger $r_y/i$ is, the higher the contact surface pressure is. However, if it is excessively large, then the deformation amount in the axial direction increases and a groove R is reduced, thereby spreading the contact area of the inner race with respect to the ball. In this case, a friction torque increases as well. A position near the point Q is preferred but, with the allowance difference of the contact angle taken into consideration, ±25% is practically effective.

If the axial tension is constant and $r_y/i$ is increased, then the outer periphery of the shoulder portion of the inner race is inclined to thereby reduce the groove R. This spreads an area where the ball and inner race interferes each other, thereby increasing the load to be applied to the ball.

(Eighth Embodiment)

Next, description will be given below of an eighth embodiment of an angular contact ball bearing according to the invention.

Figure 9:
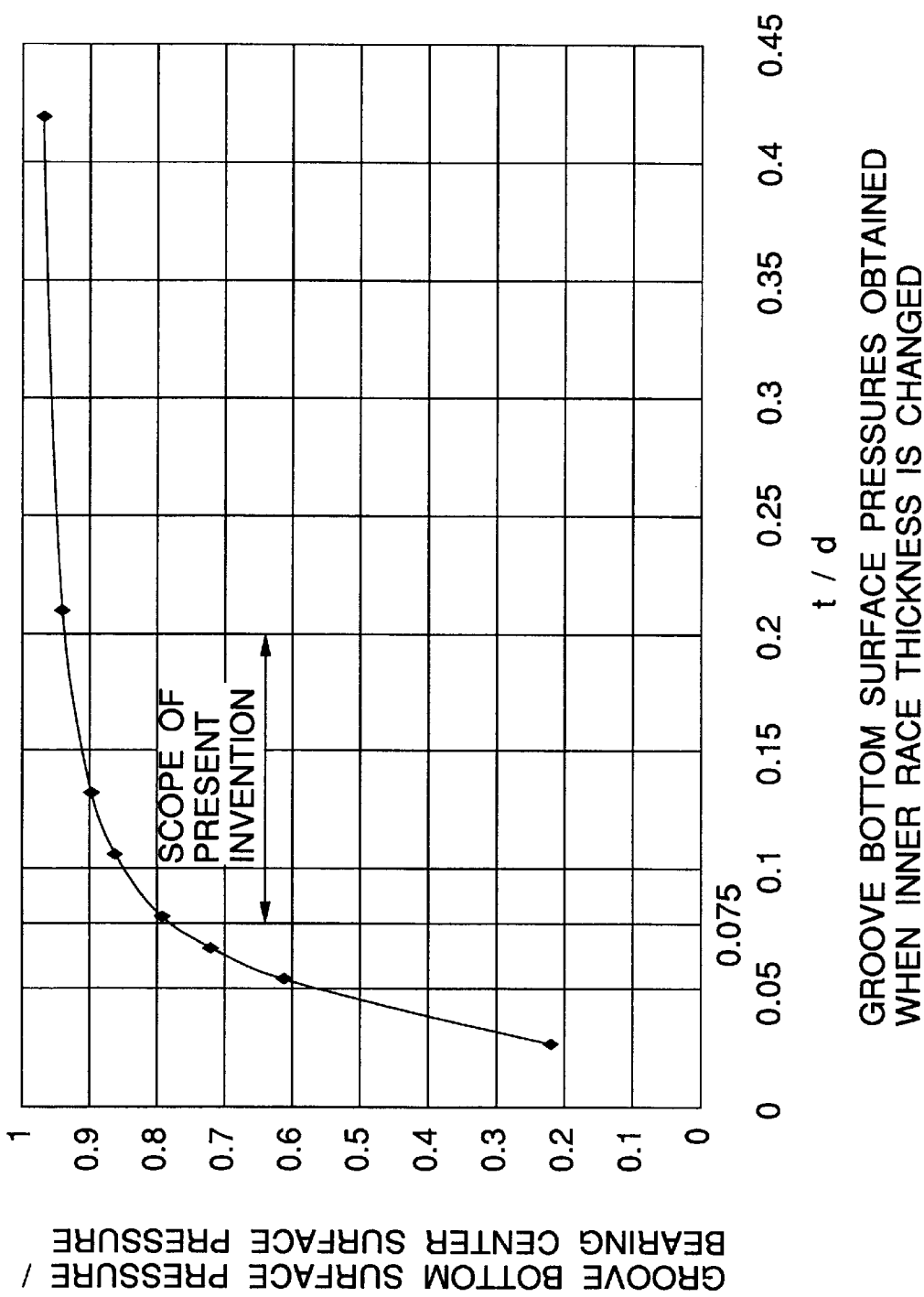
FIG. 9 is a graphical representation of the surface pressures of the groove bottom of the inner race obtained when the thickness of the inner race is changed according to the invention.

In the present embodiment, as can be seen from FIGS. 9 and 10, the thickness t the inner race is assumed to be $0.075 \leq t/d \leq 0.2$, where t expresses the thickness of the main body portion 3m of the inner race and d expresses the inside diameter defined by the inner surface portion of the inner race. Here, when (the inner race thickness t)+(the ball diameter Da)=constant and also when t=0, the life ratio is set for 1. And, P0 is also set constant.

According to the results of the FEM calculation, the greater the thickness of the inner race is, the higher the contact surface pressure is. In the range of t/d<0.075, the surface pressure decreases suddenly. The reason for this is as follows: that is, the smaller the thickness of the inner race is, the lower the rigidity of the inner race itself is, which increases the rate at which the shoulder portion of the inner race is bent outwardly by the outwardly opening moment around the point P, thereby lowering the surface pressure of the groove bottom of the inner race. To increase the thickness of the inner race, since the inner and outer shape dimensions of the bearing are specified, it is inevitable to reduce the diameter of the ball. However, if the ball diameter is reduced, then the rigidity of the bearing is lowered and the life of the bearing is thereby shortened; that is, there is a limit to the reduction of the ball diameter. The life of the bearing is shortened suddenly in the range of 0.2<t/d. If the thickness of the inner race is small, then the rigidity of the inner race itself is lowered; and, therefore, the inner race must have a certain thickness.

As the value of t/d increases, the fitting surface pressure of the shaft and inner race (the surface pressure of the center of the bearing) rises. Then, there is necessary a condition $0.8 \leq PC/PF$. Therefore, to satisfy this condition, a condition $0.075 \leq t/d$ is necessary (it is necessary to prevent the floating-up of the inner race).

Also, if $0.2 < t/d$, then it is inevitable to reduce Da from the viewpoint of the design of the bearing, which lowers C0 (the basic movement rate load) to thereby lower the performance of the bearing in the equation (2), with the result that the life of the bearing is shortened.

This is the reason why $0.075 \leq t/d \leq 0.2$ is employed.

(Effect of the Present Invention)

By reducing the outwardly opening moment around the point P in the fitting surface end portion between the inner race and shaft to thereby increasing the inwardly inclining moment, the floating-up of the inner race can be prevented to thereby prevent the lowered contact surface pressure, which makes it possible to prevent the occurrence of the creep phenomenon.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An angular contact ball bearing comprising:

an outer race;

an inner race to be mounted on a shaft, said inner race being constituted by a main body portion (3m) and a shoulder portion (3a), said inner race having an axially outward end face (3j) formed on said shoulder portion (3a), an inner surface portion (3f) which is brought in pressure contact with said shaft, an escape portion (3c) which is disengaged with said shaft and disposed at a corner of said shoulder portion (3a) between said axially outward end face (3j) and said inner surface portion (3f), and inner race groove (3g); and a rolling element interposed between said outer race and said inner race groove (3g) of said inner race, wherein, in a cross-section along a plane containing an axis of said shaft, a length (L) of said shoulder portion (3a) and a length ($r_x$) of the escape portion (3c) in the axial direction of the shaft satisfy a relationship of $r_x \leq L \leq 10 r_x$, wherein said length (L) of said shoulder portion (3a) is directed to a distance between a first intersecting point (J1) at which a line extending along an outer peripheral side surface (3t) of said shoulder portion (3a) crosses a line extending along said inner race groove (3g) toward said outer peripheral side surface (3t), and a second intersecting point (J2) at which a line extending along said axially outward end face (3j) crosses said line extending along the outer peripheral side face (3t), and wherein said length ($r_x$) of the escape portion (3c) is directed to a distance between an a third intersecting point (J3) at which said line extending along said axially outward end face (3j) crosses a line extending along said inner surface portion (3f) and a fourth intersecting point (P) at which said inner surface portion (3f) connects to said escape portion (3c).

2. The angular contact ball bearing according to claim 1, wherein in the cross-section, a height (h) of said shoulder portion (3a) in the radial direction of the shaft and an outer diameter ($D_a$) of said rolling element satisfy a relationship of $0.45 \, D_a \leq h \leq 0.9 D_a$ wherein said height (h) of said shoulder portion (3a) is directed to a distance calculated by deducting a thickness (t) of said main body portion (3m) from a length between said second intersecting point (J2) and said third intersecting point (J3).

3. The angular contact ball bearing according to claim 1, wherein, in the cross-section, the length (L) of said shoulder portion (3a) in the axial direction, the length ($r_x$) of the escape portion (3c) in the axial direction, and a distance (a) between said third intersecting point (J3) and a fifth intersecting point (A) which is defined by intersecting said inner surface portion (3f) and a line containing both of a center point of said rolling element and a contact point (Q) where said rolling element contacts with said inner race groove (3g) of said inner race satisfy a relationship of $r_x \leq a \leq L$.

4. An angular contact ball bearing comprising:

an outer race;

an inner race to be mounted on a shaft, said inner race being constituted by a main body portion (3m) and a shoulder portion (3a), said inner race having an axially outward end face (3j) formed on said shoulder portion, an inner surface portion (3f) which is brought in pressure contact with said shaft, an escape portion (3c) which is disengaged with said shaft and disposed at a corner of said shoulder portion (3a) between said axially outward end face (3j) and said inner surface portion (3f), and inner race groove (3g); and a rolling element interposed between said outer race and said inner race, wherein said shoulder portion (3a) includes an axial outside part, which is located axially outside a line which extends in a radial direction of said shaft and contains an intersecting point (P) at which said inner surface portion (3f) connects to said escape portion (3c), and a cut-off portion defined by cutting-off a corner part of said axially outside part which is disposed at a corner between an outer peripheral side face (3t) of said shoulder portion (3a) and said axially outward end face (3j), in which, in a cross-section along a plane containing an axis of said shaft, a sectional area (S) of said axial outside part and a sectional area (S1) of said cut-off portion satisfy a relationship of $0.1S \leq S1 \leq 0.5S$.

5. An angular contact ball bearing comprising:

an outer race;

an inner race to be mounted on a shaft, said inner race being constituted by a main body portion (3m) and a shoulder portion (3a), a rolling element interposed between said outer race and said inner race, wherein said main body portion (3m) has an axially inward end face (3h), an outer peripheral surface (3x) engaged with said rolling element, and an inner surface portion (3f) engaged with said shaft, wherein said main body portion (3m) having an outer chamfered portion (C1) which is formed at a corner between said axially inward end face (3h) and said outer peripheral surface (3x) and an inner chamfered portion (C2) which is formed at a corner between said axially inward end face (3h) and said inner surface portion (3f); and wherein, in a cross-section along a plane containing an axis of said shaft, the height (C1) of the outer chamfered portion and the height (C2) of the chamfered portion in the radial direction of the shaft satisfy the relation $0 \leq C2/C1 \leq 1$.

6. An angular contact ball bearing comprising:

an outer race;

an inner race to be mounted on a shaft, said inner race being constituted by a main body portion (3*m*) and a shoulder portion (3*a*), and a rolling element interposed between said outer race and said inner race, wherein said main body portion (3*m*) has an axially inward end face (3*h*), an outer peripheral surface (3*x*) engaged with said rolling element, and an inner surface portion (3*f*) engaged with said shaft, and wherein, in a cross-section along a plane containing an axis of said shaft, said axially inward end face is inclined relative to a line ourwardly extending in a radial direction of the shaft with an inclination angle θ in the range of 0.5~5°.

7. An angular contact ball bearing comprising:

an outer race;

an inner race to be mounted on a shaft, said inner race being constituted by a main body portion (3*m*) and a shoulder portion (3*a*), said inner race having an axially outward end face (3*j*) formed on said shoulder portion (3*a*), an inner surface portion (3*f*) which is brought in pressure contact with said shaft, an escape portion (3*c*) which is disengaged with said shaft and disposed at a corner of said shoulder portion (3*a*) between said axially outward end face (3*j*) and said inner surface portion (3*f*), and inner race groove (3*g*); and a rolling element interposed between said outer race and said inner race, wherein, in a cross-section along a plane containing the axis of said shaft, a length ($r_y$) of the escape portion (3*c*) in a radial axial direction of the shaft and a length (i) which is a shortest distance between the inner surface portion (3*f*) and a contact point (Q) at which said rolling element contacts with said inner race satisfy a relationship of $0.75i \leq r_y \leq 1.25i$.

8. An angular contact ball bearing comprising:

an outer race;

an inner race to be mounted on a shaft, said inner race being constituted by a main body portion (3*m*) and a shoulder portion (3*a*), and a rolling element interposed between said outer race and said inner race, wherein said main body portion (3*m*) has an axially inward end face (3*h*), an outer peripheral surface (3*x*) engaged with said rolling element, and an inner surface portion (3*f*) engaged with said shaft, and wherein a thickness (t) of said main body portion in a radial direction of said shaft and a diameter (d) defined by said inner surface portion (3*f*) satisfy a relationship of $0.075d \leq t \leq 0.2d$.

* * * * *